United States Patent
Tao et al.

(10) Patent No.: US 8,014,263 B2
(45) Date of Patent: Sep. 6, 2011

(54) CROSS-TALK CANCELLATION IN COOPERATIVE WIRELESS RELAY NETWORKS

(75) Inventors: Zhifeng Tao, Allston, MA (US); Philip V. Orlik, Cambridge, MA (US); Jun Ma, Atlanta, GA (US); Ye Li, Marietta, GA (US); Jinyun Zhang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 155 days.

(21) Appl. No.: 12/543,671

(22) Filed: Aug. 19, 2009

(65) Prior Publication Data

US 2011/0044158 A1  Feb. 24, 2011

(51) Int. Cl.
*H04J 1/12* (2006.01)
*H04B 7/14* (2006.01)

(52) U.S. Cl. .......................... 370/201; 455/7

(58) Field of Classification Search ............... 370/201, 370/282; 455/24, 63.1–63.4, 64, 65, 278.1, 455/283–288, 296, 501–506
See application file for complete search history.

(56) References Cited

U.S. PATENT DOCUMENTS

| | | | |
|---|---|---|---|
| 7,702,048 B2* | 4/2010 | Guess et al. | 375/346 |
| 7,711,075 B2* | 5/2010 | Guess et al. | 375/346 |
| 2003/0086515 A1* | 5/2003 | Trans et al. | 375/346 |
| 2006/0045054 A1* | 3/2006 | Utsumi et al. | 370/338 |
| 2007/0038743 A1* | 2/2007 | Hellhake et al. | 709/224 |
| 2008/0165720 A1* | 7/2008 | Hu et al. | 370/315 |
| 2010/0008294 A1* | 1/2010 | Palanki et al. | 370/328 |

OTHER PUBLICATIONS

Nasr et al., "Performance of an echo canceller and channel estimator for on-channel repeaters in DVB-T/H networks," IEEE Trans. Broadcasting, vol. 53, No. 3, pp. 609-618, Sep. 2007.

Mazzotti et al., "Performance of an echo canceller based on pseudonoise training sequences," Proc. 58th Annual IEEE Broadcast Symposium, Oct. 2008.

\* cited by examiner

*Primary Examiner* — Chi Pham
*Assistant Examiner* — Robert Lopata
(74) *Attorney, Agent, or Firm* — Dirk Brinkman; Gene Vinokur

(57) ABSTRACT

Cross-talk is canceled in a cooperative wireless relay network that includes a base station (BS), a relay station (RS), and a mobile station (MS). A coupling channel between a transmit antenna and a receive antenna colocated at the RS is estimated. Cross-talk interference determination is based on a previous transmitted signal by the transmit antenna, and the coupling channel. The cross-talk interference is subtracted from a currently received signal by the receive antenna to obtain a residual signal. The residual signal is then transmitted as a next transmitted signal by the transmit antenna.

14 Claims, 7 Drawing Sheets

100

CROSS-TALK CANCELLATION IN COOPERATIVE WIRELESS RELAY NETWORKS

FIELD OF THE INVENTION

This invention relates generally to wireless relay networks, and more particularly to canceling cross-talk in cooperative wireless relay stations.

BACKGROUND AND PRIOR ART

In wireless networks, a base station (BS) is usually located near the center of a cell. As a result, the quality of signals received at a mobile station (MS) near an edge of the cell is reduced. This problem can be resolved by decreasing the size of the cell. However, this increases costs because the number of BSs needs to be increased to provide the same service for the same coverage area. In addition, this also may cause higher level of interference to MSs residing at the edge of neighboring cells. An alternative solution uses a less complex relay station (RS), which assists in communications between the BS and the MS. The RS can effectively increase coverage and reliability with decreased transmit power and cost.

The RS can be deployed anywhere in the cell wherein direct communication between the BS and the MS is impaired. The RS can also be deployed temporarily in areas where the number of MSs is expected to increase dramatically for a short time period, e.g., large-scale public events.

The RS can use decode-and-forward (DF) or amplify-and-forward (AF) modes. The DF mode detects and demodulates received signals before retransmitting. The AF mode only amplifies the received signal before retransmitting.

Conventionally, the RS can use different frequencies or times to reduce interference. In a frequency-reuse-relay-station (FRRS), the frequency bands for transmitting and receiving signals are identical. In a frequency-shifted-relay-station (FSRS), the frequency bands are different. While the FRRS increases spectral efficiency, cross-talk interference becomes an issue because the transmit signal power is always greater than the receive signal power. In the FSRS, out-of-band leakage can cause cross-talk interference.

Cross-talk occurs when a transmitted signal interferes with a currently received signal. Cross-talk can be caused by undesired capacitive, inductive, or conductive coupling between the transmit antenna and the colocated receive antenna, or lines and circuits to which the antennas are connected. Cross-talk is often denoted as co-channel interference, and is related to adjacent-channel interference, see Nasr et al., "Performance of an echo canceller and channel estimator for on-channel repeaters in DVB-T/H networks," IEEE Trans. Broadcasting, vol. 53, no. 3, pp. 609-618, September 2007, and Mazzotti et al., "Performance of an echo canceller based on pseudo-noise training sequences," Proc. 58th Annual IEEE Broadcast Symposium, October 2008.

Prior art techniques require the RS to transmit dedicated pilot signals, such as pseudo-noise sequences, for estimating the coupling channel between the colocated transmit and receive antennas. The pilot signals change the existing signal structure of the physical layer, leading to incompatibility with legacy standards, and also result in interference at the receiver.

It is desired to perform cross-talk cancellation at the RS that is transparent to current wireless standard, i.e., the structure of the signals at physical layer remains the same at the BS and the MS.

SUMMARY OF THE INVENTION

The embodiments of the invention object provide a method for canceling cross-talk interference in a wireless frequency-reuse-relay-station (FRRS) or a frequency-shifted-station (FSRS) using signals that are designed according to current wireless standards.

The RS estimates a coupling channel between a transmit antenna and a colocated receive antenna from a previous transmitted signal and a currently received signal. Based on the coupling channel, the cross-talk interference at the RS can be reconstructed, and cross-talk interference can be reduced.

DETAILED DESCRIPTION OF THE PREFERRED EMBODIMENTS

Relay Network

Figure 1:
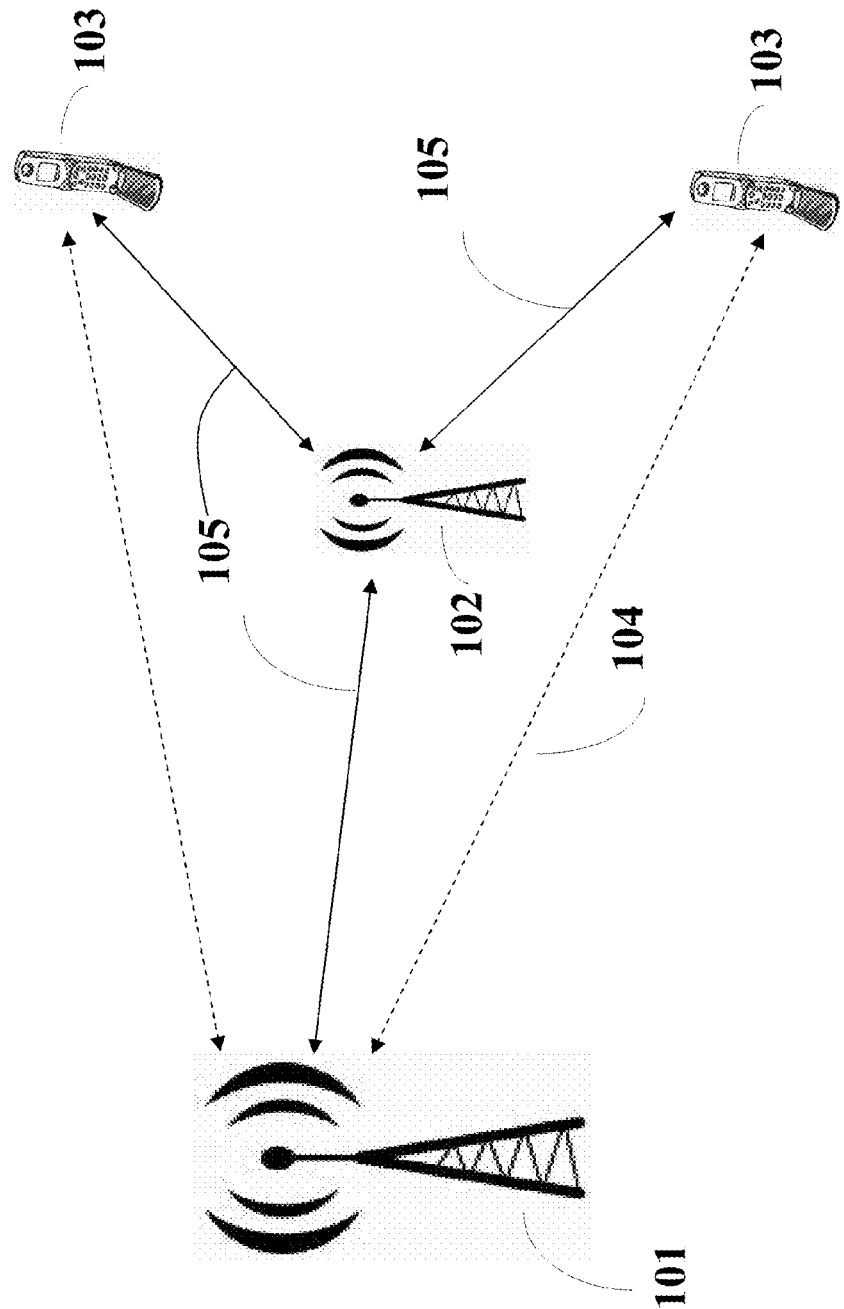
FIG. 1 is a schematic of a cooperative relay network operating according to the embodiments of the invention.

FIG. 1 shows a cooperative relay network 100 operating according to the embodiments of the invention. The wireless network can be a local area network (LAN), a metropolitan area network (MAN), or a large-scale cellular network. The network includes a base station (BS) 101, a relay station (RS) 102, and a mobile station (MS) 103. There can be multiple RSs and MSs. The BS is stationary, and the RSs can be fixed, moving occasionally (nomadic), or mobile. The MS are typically mobile. In the cooperative network, the RS operates as a repeater and communicates signals 105 between the BS and the MSs, or the BS and the MSs communicate directly.

The RS operates as a frequency-reuse-relay-station (FRRS), or as a frequency-shifted-relay-station (FSRS). The RS can cooperate by using the identical frequency band for receiving and transmitting. Thus, depending on the specific cooperative scheme applied, there can be direct communication links 104 between the BS and the MS, as well as the indirect links 105 so as to achieve cooperation.

Cross-Talk Interference at the RS

Figure 2:
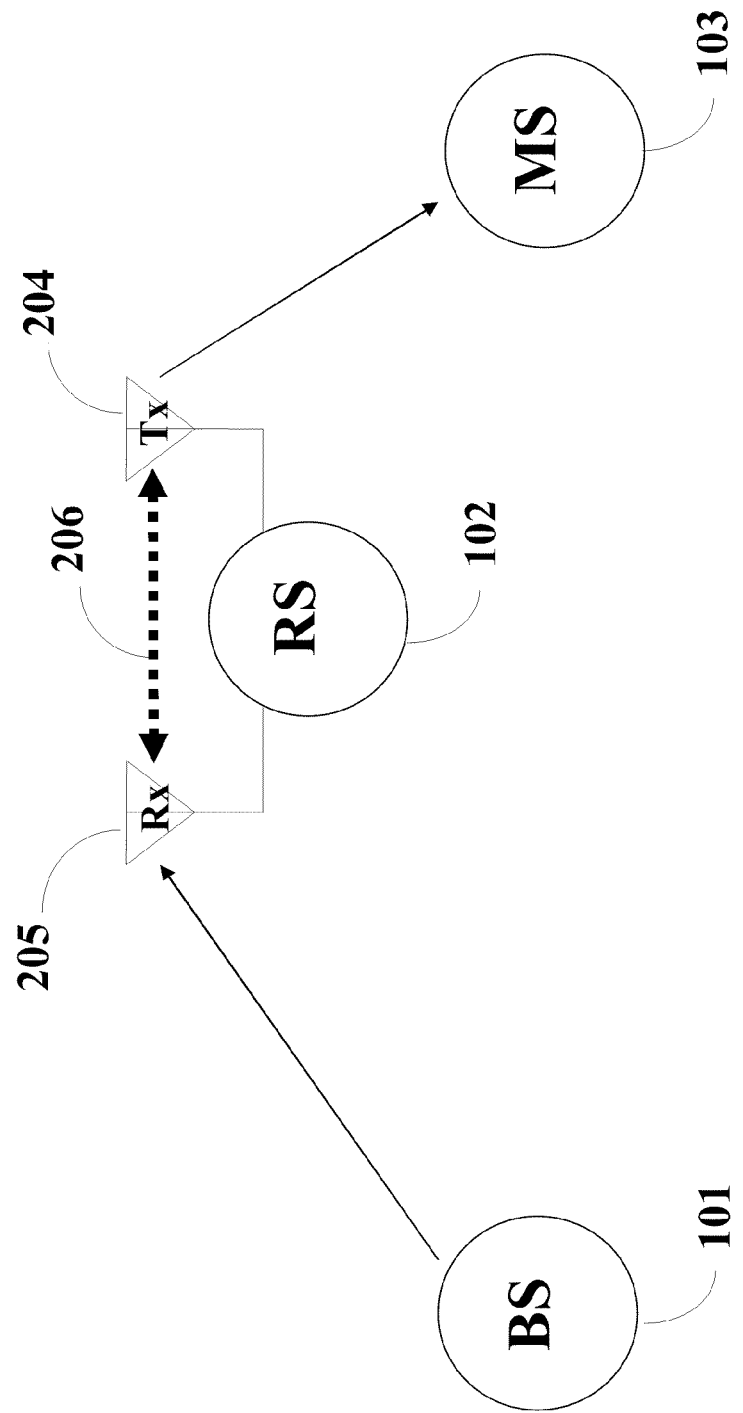
FIG. 2 is a schematic of the cross-talk interference at a relay station operating in the network of FIG. 1 according to the embodiments of the invention.

FIG. 2 shows cross-talk interference at the RS. The cross-talk 206 is between the transmit antenna 204 and the colocated receive antenna 205 of the RS 202. For the FRRS the interference corresponds to co-channel interference. For the FSRS, the interference is caused by out-of-band leakage of the transmitted signal to the received signal because the transmit signal power is significantly greater than the received signal power. We note that FIG. 2 shows the operation of the RS when it acts to forward data in the downlink direction, from BS to MS. It should be understood that for uplink forwarding the role of the receiver and transmitter at the RS are reversed.

The RS can have multiple transmit antennas colocated with multiple receive antennas. A desired received symbol vector at the RS is s(n) in the $n^{th}$ symbol period, for example, an orthogonal frequency-division multiplexing (OFDM) symbol period. The transmitted symbol matrix or the leakage symbol matrix of the transmitted signal of the RS is $\hat{x}(n-1)$, which is based on the transmitted symbols and the transmit filter at the RS in the last symbol period. The composite coupling channel vector from the transmit antenna to the receive antenna of the RS is $h_c$, and a white noise vector is w(n). The received symbol vector at the RS in the $n^{th}$ symbol period is $$y(n) = s(n) + i(n) + w(n)$$
$$= s(n) + \hat{X}(n-1)h_c + w(n),$$

where $i(n)=\hat{X}(n-1)h_c$ denotes the cross-talk interference to be cancelled at the RS. The invention recovers the desired signal s(n), i.e., s(n)=y(n)−(i(n)+w(n)). It is also noted that the RS introduces a delay of one symbol, OFDM symbol period. This enables the estimation of the coupling channel, as will be shown below, by providing the RS's receiver with a known interference.

Cross-Talk Cancellation Based on Coupling Channel Estimation

Figure 3:
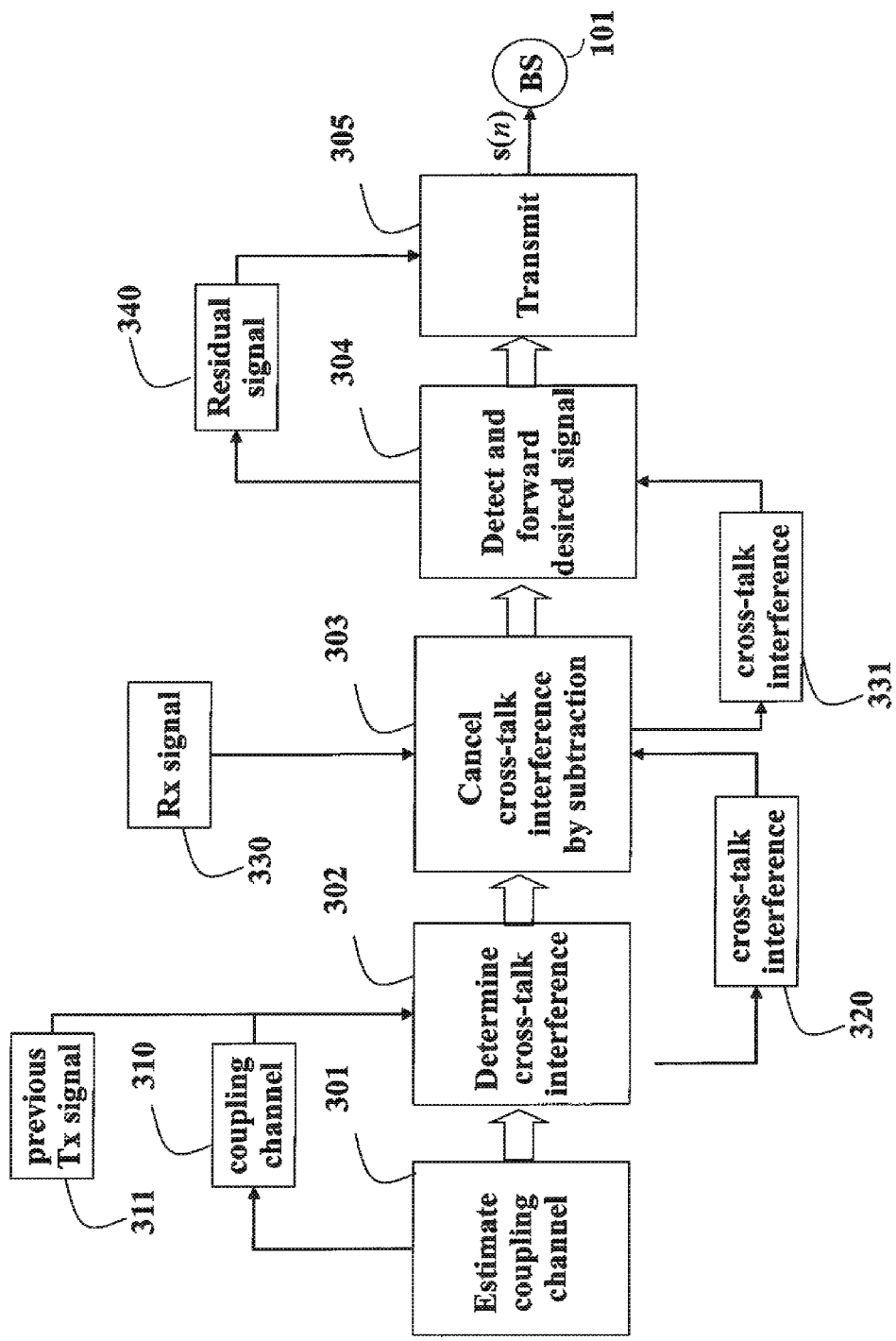
FIG. 3 is a flow diagram of a cross-talk cancellation method according to embodiments of the invention.

FIG. 3 shows a method for cross-talk cancellation according to embodiments of our invention. The steps of the method are performed in a processor at the relay station.

We estimate 301 a coupling channel 310 between the transmit antenna 204 and the colocated receive antenna 205 at the RS 201. Based on the estimated coupling channel and a previous transmitted signal Tx 311 transmitted by the RS in a last symbol period, we determine 302 the cross-talk interference 320.

To cancel 303 the cross-talk, we subtract cross-talk interference 320 from the currently received signal Rx 330 to obtain a residual signal 340. Then, we process the residual signal to obtain the desired next transmit signal to transmit 305. This method can operate for either downlink transmissions from the BS to the MS, or uplink transmissions from the MS to BS. The next signal becomes the previous transmit signal in the next iteration.

Because the previous transmitted signal $\hat{x}(n-1)$ 311 is exactly known by the RS, the signal can be used to estimate the coupling channel 310. In this way, our invention realizes the estimation of the coupling channel without transmitting pilot signals as in the prior art. Because the desired signal is unknown at the RS, the signal is regarded as noise when estimating the coupling channel. Because the transmit antenna and the receive antenna are colocated at the RS, the coupling channel is stationary over time. Therefore, we can use multiple previous transmitted symbol matrices to improve the accuracy of the estimation.

Figure 4:
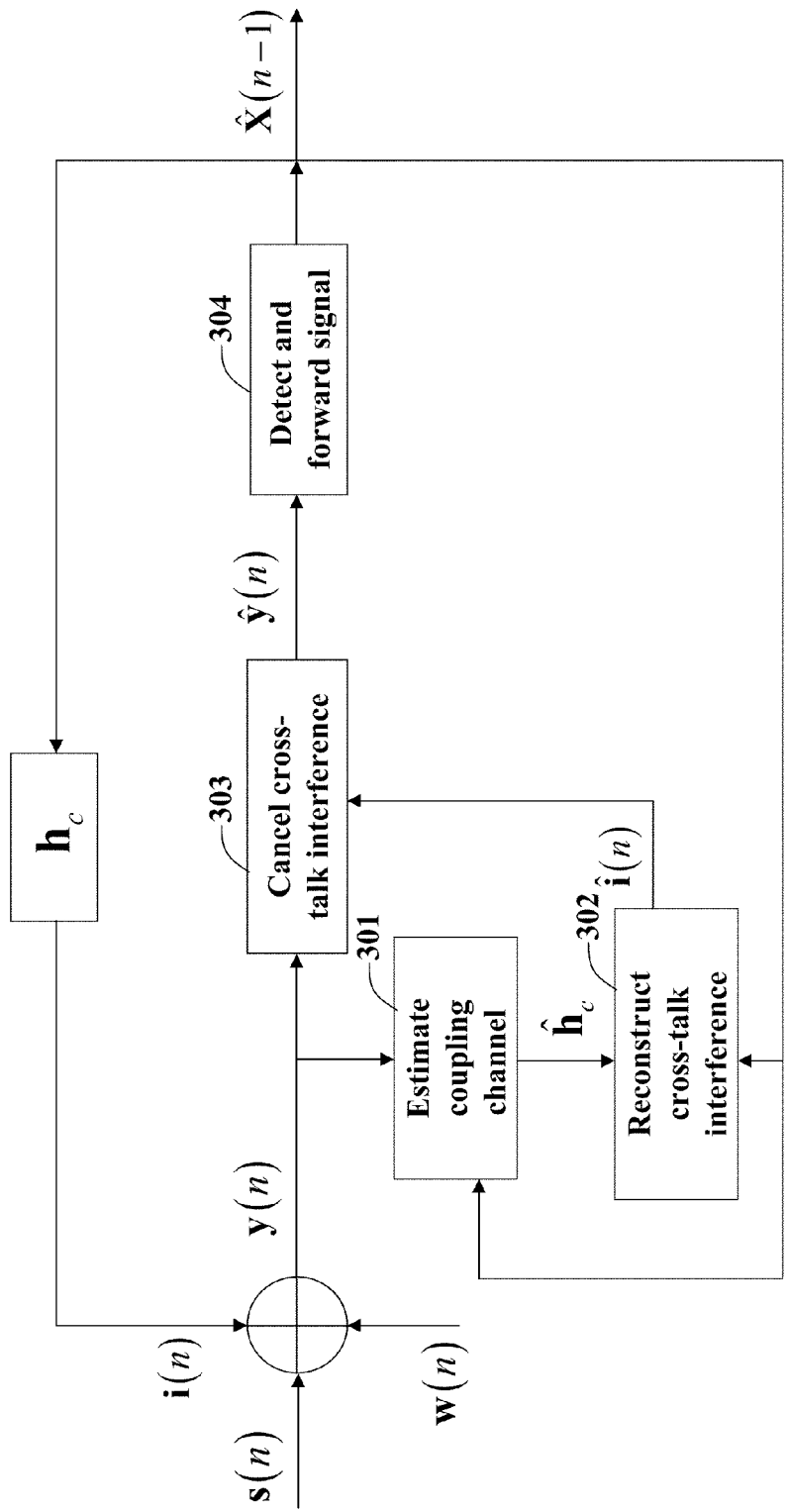
FIG. 4 is a block diagram of a cross-talk cancellation module according to the embodiments of the invention.

FIG. 4 shows the cross-talk cancellation circuit according to the embodiments of our invention. Based on the previous transmitted symbol matrices $\hat{X}(n-1)$, and the currently received symbol vectors y(n), which includes the cross-talk interference i(n), we estimate 301 the coupling channel $\hat{h}_c$ from the transmit antenna to the receive antenna at the RS to determine 302 the cross-talk interference î(n). Then, the cross-talk interference is subtracted 303 from the currently received signal to obtain an estimate ŷ(n) of the desired signal to generate the forwarded symbol matrices $\hat{X}(n-1)$ for the next transmitted signal.

Cross-Talk with OFDM Modulation

In one embodiment of our invention, we cancel cross-talk at the RS with a set $M_r \geq 1$ of receive antennas colocated with a set $M_t \geq 1$ transmit antennas. For K-subcarrier orthogonal frequency-division multiplexing (OFDM) modulation, the received symbol vector over the $k^{th}$ subcarrier of the $n^{th}$ OFDM symbol is $$y(n,k)=s(n,k)+i(n,k)+w(n,k),$$

where $$i(n,k)=H_c(k)\hat{x}(n-1,k)$$

denotes the cross-talk interference, $\hat{x}(n-1,k)$ denotes the transmitted symbol vector of the RS in the last OFDM symbol, and $H_c(k)$ denotes the coupling channel of the RS over the $k^{th}$ subcarrier.

A multiple-tap, time-domain coupling channel has a maximum delay of L OFDM sampling intervals, with the $M_r \times M_t$ channel matrix on the $l^{th}$ tap $H_{c,l}$, $1 \leq l \leq L-1$. Thus, the cross-talk interference over the $k^{th}$ subcarrier of the $n^{th}$ OFDM symbol is $$i(n,k) = H_c(k)\hat{x}(n-1,k)$$
$$= \sum_{l=0}^{L-1} H_{c,l} e^{-j\frac{2\pi lk}{K}} \hat{x}(n-1,k)$$
$$= \sum_{l=0}^{L-1} \left[ e^{-j\frac{2\pi lk}{K}} \hat{x}^T(n-1,k) \otimes I_{M_r} \right] vec(H_{c,l}),$$

where $\otimes$ denotes the Kronecker product, $I_{M_r}$ denotes the $M_r \times M_r$ identity matrix, $vec(H_{c,l})$ denotes the vectorization of $H_{c,l}$ formed by stacking the columns of $H_{c,l}$ into a single column vector.

We define $$\hat{X}(n-1,k,l) = e^{-j\frac{2\pi lk}{K}} \hat{x}^T(n-1,k) \otimes I_{M_r},$$

$$\hat{X}(n-1,k) = \begin{pmatrix} \hat{X}(n-1,k,0), \\ \hat{X}(n-1,k,1), \dots , \\ \hat{X}(n-1,k,L-1) \end{pmatrix},$$

and $$h_c = (vec(H_{c,0})^T, vec(H_{c,1})^T, \dots, vec(H_{c,L-1})^T)^T,$$

which denotes the composite coupling channel vector to estimate to obtain $i(n,k)=\hat{X}(n-1,k)h_c$, where T is the transpose operator.

We determine the transmitted symbol matrix at the RS in the $(n-1)^{th}$ OFDM symbol as $$\hat{X}(n-1)=(\hat{X}(n-1,0)^T, \hat{X}(n-1,1)^T, \dots, \hat{X}(n-1,K-1)^T)^T.$$

Then, the cross-talk interference in the $n^{th}$ OFDM symbol is $$i(n) = (i(n,0)^T, i(n,1)^T, \dots, i(n,K-1)^T)^T$$
$$= \hat{X}(n-1)h_c.$$

Therefore, the original received symbol vector of the RS in the $n^{th}$ OFDM symbol is $$y(n) = s(n) + i(n) + w(n)$$
$$= s(n) + \hat{X}(n-1)h_c + w(n),$$

where $$s(n) = (s(n,0)^T, s(n,1)^T, \ldots, s(n,K-1)^T)^T$$

and $$w(n) = (w(n,0)^T, w(n,1)^T, \ldots, w(n,K-1)^T)^T.$$

We denote the composite transmitted symbol matrix of the RS in the previous N OFDM symbols as $$\hat{X}_N = (\hat{X}(n-1)^T, \hat{X}(n-2)^T, \ldots, \hat{X}(n-N)^T)^T,$$

and then the corresponding composite received symbol vector of the RS is $$y_N = (y(n)^T, y(n-1)^T, \ldots, y(n-(N-1))^T)^T$$
$$= i_N + s_N + w_N,$$

where $i_N = \hat{X}_N h_c$ denotes the cross-talk interference, $$s_N = (s(n)^T, s(n-1)^T, \ldots, s(n-(N-1))^T)^T,$$

and $$w_N = (w(n)^T, w(n-1)^T, \ldots, w(n-(N-1))^T)^T.$$

Cross-Talk Cancellation Based on Least-Square Coupling Channel Estimation

Because the previous transmitted symbol matrix, $\hat{X}_N$, is known exactly at the RS, we can obtain a least-square (LS) estimate of the composite coupling channel vector as $$\hat{h}_{c,LS} = (\hat{X}_N^H \hat{X}_N)^{-1} \hat{X}_N^H y_N = [F(n)]^{-1} g(n),$$

where $$F(n-j) = \sum_{i=j+1}^{N} \hat{X}^H(n-i)\hat{X}(n-i),$$

and $$g(n-j) = \sum_{i=j+1}^{N} \hat{X}^H(n-i)y(n-i+1), 0 \le j \le N-1,$$

and $$F(n-j) = F(n-j-1) + \hat{X}^H(n-j-1)\hat{X}(n-j-1),$$

and $$g(n-j) = g(n-j-1) + \hat{X}^H(n-j-1)y(n-j),$$

can be determined iteratively to reduce the complexity of estimating coupling channels in multiple consecutive OFDM symbols.

Figure 5:
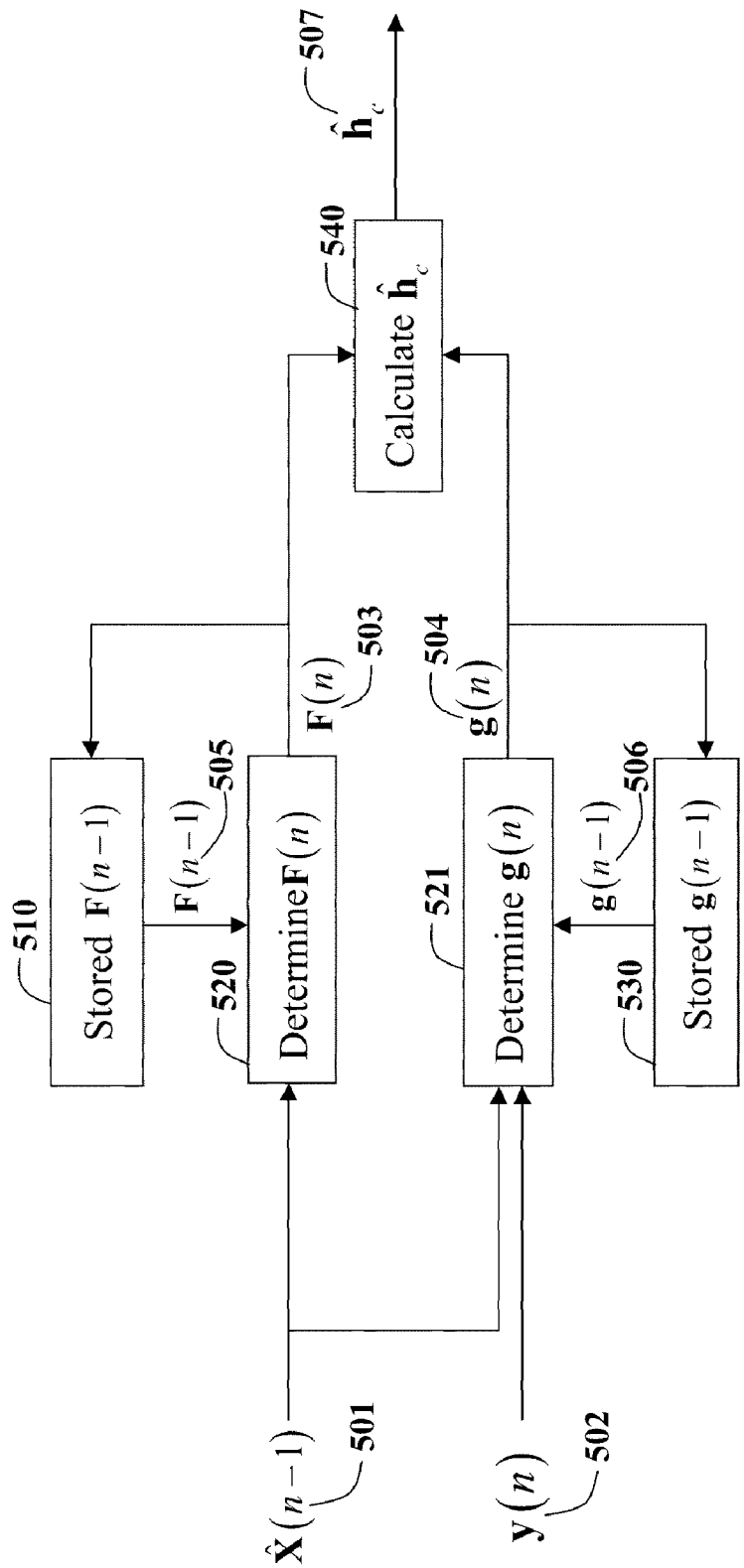
FIG. 5 is a block diagram of a least square and minimum mean-square error coupling channel estimation module at a relay station according to embodiments of the invention.

FIG. 5 shows a block diagram of coupling channel estimation at the RS. Given the previous transmitted symbol matrix $\hat{X}(n-1)$ 501 at the RS, and the currently received symbol vector $y(n)$ 502, $F(n)$ 503 and $g(n)$ 504 can be determined 520-521 based on the stored 510 $F(n-1)$ 505 and the stored 530 $g(n-1)$ 506 for the last OFDM symbol, respectively. Then, the estimate $\hat{h}_c$ 507 of the coupling channel is determined 540 from $F(n)$ and $g(n)$, and $F(n)$ and $g(n)$ are stored for the next coupling channel estimation, while the previous stored $F(n-1)$ and $g(n-1)$ are discarded.

Based on the estimated coupling channel $\hat{h}_{c,LS}$, the cross-talk interference at the RS is reconstructed as $\hat{i}(n) = \hat{X}(n-1)\hat{h}_{c,LS}$. We subtract $\hat{i}(n)$ from the currently received signal, and we obtain the estimated desired signal as $$\hat{y}(n) = y(n) - \hat{i}(n)$$
$$= s(n) + w(n) + e(n),$$

where $$e(n) = \hat{X}(n-1)(h_c - \hat{h}_{c,LS})$$
$$= -\hat{X}(n-1)(\hat{X}_N^H \hat{X}_N)^{-1} \hat{X}_N^H \square (s_N + w_N)$$

denotes the residual error vector after cross-talk cancellation.

Our cross-talk cancellation method based on the LS estimation of the coupling channel is applicable to the RS with decode-and-forward (DF) or amplify-and-forward (AF) modes, or other relay mechanism. Furthermore, the method is applicable to both an FRRS and an FSRS. When applied to an FRRS, $\hat{X}(n-1)$ denotes the transmitted symbol matrix at the RS in the $(n-1)^{th}$ OFDM symbol; when applied to an FSRS, $\hat{X}(n-1)$ denotes the leakage symbol matrix of the transmitted signal in the $(n-1)^{th}$ OFDM symbol, which can be obtained based on the transmitted signal and the out-of-band leakage of the transmit filter of the RS.

Coupling Channel Estimation and Cross-Talk Cancellation at a DF-Based RS

In one embodiment of our invention, the source station (SS) has M, ($\ge 1$) transmit antennas, which, depending on the direction of communication can be the BS or the MS. If we denote the $M_s$-dimensional transmitted symbol vector of the SS over the $k^{th}$ subcarrier of the $n^{th}$ OFDM symbol as $x(n,k)$, and the corresponding $M_r \times M_s$ channel matrix from the SS to the RS as $H_r(n,k)$, then the desired signal vector at the RS is $$s(n,k) = H_r(n,k) \times (n,k).$$

If we denote $s(n) = (s(n,0)^T, s(n,1)^T, \ldots, s(n,K-1)^T)^T$ as the composite received signal vector at the RS in the $n^{th}$ OFDM symbol, then $s(n) = H_r(n) x(n)$, where $$H_r(n) = \text{diag}\{H_r(n,0), H_r(n,1), \ldots, H_r(n,K-1)\}$$

denotes the frequency-domain block diagonal channel matrix between the SS and the RS.

In the case that the RS uses the DF mode, both the transmitted symbols of the SS and those of the RS have identical power, and the wireless channel from the SS to the RS is subject to Rayleigh fading. It can be shown that the composite signal matrix in the previous N OFDM symbols $s_N$ is independent of the forwarded symbol matrix of the RS $\hat{X}_N$. In this case, the correlation matrix of the residual error vector after cross-talk cancellation based on the LS coupling channel estimation is $$R_{e,LS}(n) = E\{\hat{X}(n-1)(h_c - \hat{h}_{c,LS})(h_c - \hat{h}_{c,LS})^H \hat{X}^H(n-1)\}$$
$$= \hat{X}(n-1)(\hat{X}_N^H \hat{X}_N)^{-1} \hat{X}_N^H (R_s + R_w) \hat{X}_N (\hat{X}_N^H \hat{X}_N)^{-1} \hat{X}^H(n-1),$$

where $R_s = E\{s_N s_N^H\}$ and $R_2 = E\{w_N w_N^H\}$ denote the correlation matrices of the composite desired signal and noise vectors, respectively, and the expectation $E\{\cdot\}$ is with respect to noise, random transmitted signal of the SS, and the random channel from the SS to the RS.

In our invention, $R_e(n)$ is utilized to improve the detection of the desired signal at the RS, for example, by whitening the noise containing the residual error, or by performing the minimum mean-square error (MMSE) estimate of the transmitted symbol vector of the SS.

In the case that the transmitted signals of the SS are independent across different OFDM subcarriers and different OFDM symbols, the multi-tap time-domain channel between the SS and the RS has independent channel gains over different taps, and the $M_r \times M_s$ channel matrix over each tap has independently and identically distributed elements, it can be shown that $R_s = M_s \sigma_x^2 \sigma_h^2 I_{NKM_r}$, where $\sigma_x^2$ denotes the constant power of the transmitted symbol over each subcarrier from a transmit antenna of the RS, $\sigma_h^2$ denotes the average power gain of the channel from the SS to the RS, and $I_{NKM_r}$ denotes the $NKM_r \times NKM_r$ identity matrix. Further, we denote $\sigma_w^2$ as the white noise power at the RS, and then $R_{e,LS}(n)$ can be simplified as $$R_{e,LS}(n) = (\sigma_w^2 + M_s \sigma_x^2 \sigma_h^2) \hat{X}(n-1) F^{-1}(n)$$

When the correlation matrix of the composite coupling channel vector $R_{h_c} = E\{h_c h_c^H\}$ is known, our invention further obtains an MMSE estimate of $h_c$ based on the received signal in the previous N OFDM symbols as $$\hat{h}_{c,MMSE} = [R_{h_c}^{-1} + \hat{X}_N^H (R_s + R_W)^{-1} \hat{X}_N]^{-1} \hat{X}_N^H (R_s + R_W)^{-1} y_N.$$

The corresponding correlation matrix of the residual error vector after cross-talk cancellation is $$R_{e,MMSE}(n) = E\{\hat{X}(n-1)(h_c - \hat{h}_{c,MMSE})(h_c - \hat{h}_{c,MMSE})^H \hat{X}^H(n-1)\}$$
$$= \hat{X}(n-1) \left[R_{h_c}^{-1} + \hat{X}_N^H (R_s + R_w)^{-1} \hat{X}_N\right]^{-1} \hat{X}^H(n-1),$$

which we use to improve the detection of the desired signal at the RS.

Similarly to LS coupling channel estimation, in the case that $R_s = M_s \sigma_x^2 \sigma_h^2 I_{NKM_r}$ and $R_w = \sigma_w^2 I_{NKM_r}$, $\hat{h}_{c,MMSE}$ and $R_{e,MMSE}(n)$ can be simplified as $$\hat{h}_{c,MMSE} = \left[(\sigma_w^2 + M_s \sigma_x^2 \sigma_h^2) R_{h_c}^{-1} + \hat{X}_N^H \hat{X}_N\right]^{-1} \hat{X}_N^H y_N$$
$$= \left[(\sigma_w^2 + M_s \sigma_x^2 \sigma_h^2) R_{h_c}^{-1} + F(n)\right]^{-1} g(n),$$

and $$R_{e,MMSE}(n) = (\sigma_w^2 + M_s \sigma_x^2 \sigma_h^2) \hat{X}(n-1) [(\sigma_w^2 + M_s \sigma_x^2 \sigma_h^2) R_{h_c}^{-1} + F(n)]^{-1} \hat{X}^H(n-1),$$

respectively, where $F(n)$ and $g(n)$ are defined above.

Based on the above simplification, the MMSE coupling channel estimation is performed in our invention as shown in FIG. 5.

Simulation Results

We simulate a cooperative network in which the BS, the wireless FRRS, and the MS each have one transmit antenna and one receive antenna. OFDM modulation with 16 subcarriers is utilized for broadband transmission in this wireless network and QPSK modulation is applied over each OFDM subcarrier.

The maximum delay of the multiple-tap time-domain coupling channel from the transmit antenna to the receive antenna of the RS is two OFDM sampling intervals. The channel gains over the two taps are with independent Rayleigh fading, while the average powers decay with the delay exponentially with the exponent factor one.

The wireless channel between the source station, which may be the BS or the MS, and the RS is also with Rayleigh fading. Furthermore, the signal-to-noise ratio (SNR) at the RS is set to be 40 dB. In the simulation, the signal-to-interference ratio (SIR) is defined as the ratio of the average desired signal power to the average cross-talk interference power before cross-talk cancellation; the normalized mean-square error (MSE) after cross-talk cancellation is defined as the average power of the residual error normalized to the average power of the desired signal over each OFDM subcarrier.

Figure 6:
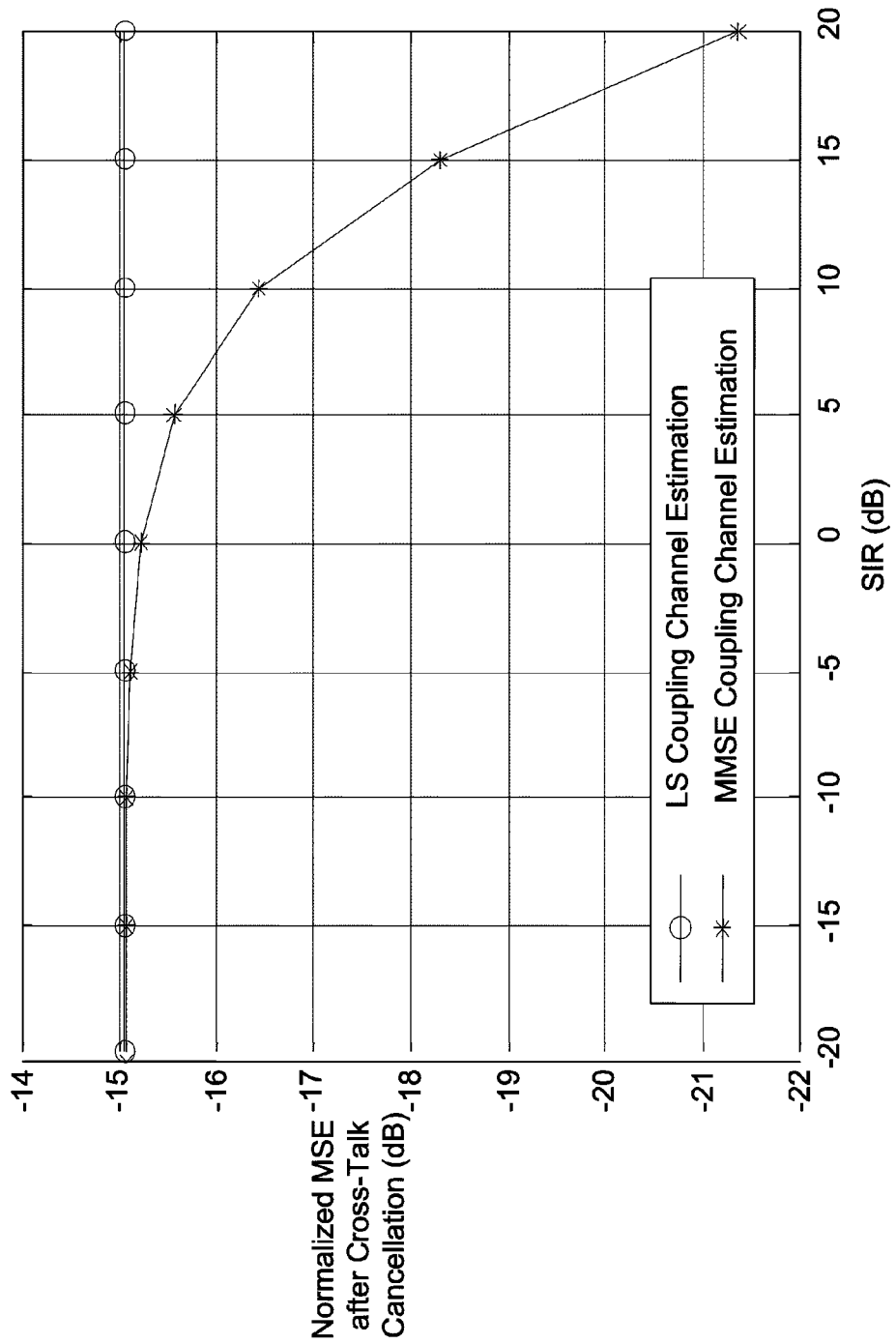
FIG. 6 is a graph comparing a normalized mean square-error (MSE) after cross-talk cancellation and a signal-to-interference ratio (SIR) before cross-talk cancellation.

FIG. 6 compares the normalized MSE and SIR when the coupling channel is jointly estimated from four previous received OFDM symbols. When the LS coupling channel estimation is applied, the normalized MSE after cross-talk cancellation is always −15.04 dB no matter what value the SIR before cross-talk cancellation takes. In other words, when the SIR is 0 dB, a 15.04 dB improvement gain is achieved by cross-talk cancellation based on the LS coupling channel estimation. When the SIR is −20 dB, a 35.04 dB improvement gain is achieved.

The Figure shows that when the SIR is less than 0 dB, which is the usual case in practice, the cross-talk cancellation based on the LS and the MMSE coupling channel estimation achieve a similar improvement gain. When the SIR is greater than 0 dB, the MMSE coupling channel estimation achieves a higher improvement gain than the LS coupling channel estimation. When the SIR is higher than 15 dB, the cross-talk cancellation based on the MMSE coupling channel estimation still achieves an improvement gain, while the estimation based on the LS coupling channel cannot.

Figure 7:
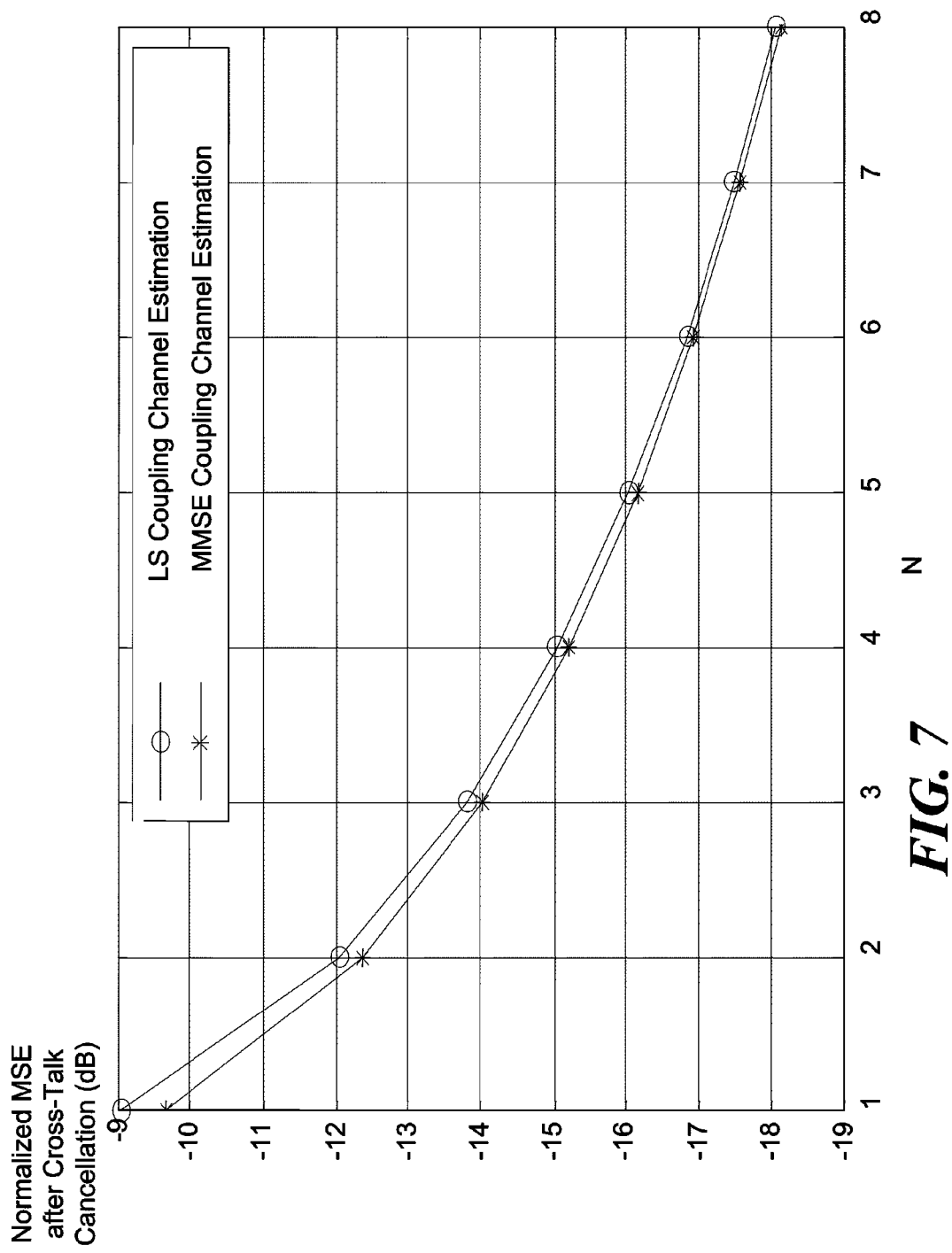
FIG. 7 is a graph comparing a normalized MSE after cross-talk cancellation with a number of recently received OFDM symbols utilized for joint coupling channel estimation.

FIG. 7 shows the normalized MSE versus the number of recently received OFDM symbols utilized for joint coupling channel estimation (N) when the SIR is 0 dB. This figure shows that when N increases from 4 to 8, the improvement gain achieved by cross-talk cancellation based on the LS coupling channel estimation increases from 15.04 dB to 18.07 dB. This figure verifies that a higher improvement gain can be achieved by jointly estimating the coupling channel in multiple consecutive OFDM symbols when the coupling channel remains unchanged during this period of time. Because no dedicated pilots are needed for coupling channel estimation, such joint coupling channel estimation in consecutive OFDM symbols does not bring extra overhead and is implemented in a low-complexity iterative way.

We claim:

1. A method for canceling cross-talk in a cooperative wireless relay network including a base station (BS), a relay station (RS), and a mobile station (MS), comprising a processor for performing the steps, comprising the steps:
   estimating a coupling channel between a transmit antenna and a receive antenna, wherein the transmit antenna and the receive antenna are colocated at the RS;
   determining cross-talk interference based on a previous transmitted signal by the transmit antenna, and the coupling channel;
   subtracting the cross-talk interference from a currently received signal by the receive antenna to obtain a residual signal, wherein for K-subcarrier orthogonal frequency-division multiplexing (OFDM), the received signal is represented by OFDM modulation, the received symbol vector over the $k^{th}$ subcarrier of the $n^{th}$ OFDM symbol is $y(n,k) = s(n,k) + i(n,k) + w(n,k)$, where n represents an OFDM symbol, k represents a subcarrier, s represents a desired signal, i represents the cross-talk interference, and w represents noise; and transmitting the residual signal as a next transmitted signal by the transmit antenna.

2. The method of claim 1, wherein the RS operates as a frequency-shifted-relay-station (FSRS).

3. The method of claim 1, wherein the RS operates as a frequency-reuse-relay-station (FRRS).

4. The method of claim 1, wherein the RS has a plurality of receive antennas and a plurality of transmit antennas.

5. The method of claim 1, wherein the previous transmitted signal is x(n−1), and the currently received signal is y(n), the cross-talk interference is i(n), the coupling channel is $h_c$.

6. The method of claim 1, in which the estimating of the coupling channel for multiple consecutive OFDM symbols is implemented iteratively.

7. The method of claim 1, wherein the RS operates in amplify-and-forward mode.

8. The method of claim 1, wherein the RS operates in decode-and-forward mode.

9. The method of claim 8, wherein the received signal and the next transmitted signal have identical power.

10. The method of claim 1, wherein the estimating uses a least-square estimate.

11. The method of claim 1, wherein the estimating uses a minimum mean-square error estimate.

12. The method of claim 1, wherein the received signal is transmitted by the BS, and the next transmitted signal is received by the MS.

13. The method of claim 1, wherein the received signal is transmitted by the MS, and the next transmitted signal is received by the BS.

14. A relay station in a cooperative wireless relay network including a base station (BS) and a mobile station (MS), comprising:

means for estimating a coupling channel between a transmit antenna and a receive antenna, wherein the transmit antenna and the receive antenna are colocated at the RS;

means for determining a cross-talk interference based on a previous transmitted signal by the transmit antenna and the coupling channel;

means for subtracting the cross-talk interference from a currently received signal by the receive antenna to obtain a residual signal, wherein for K-subcarrier orthogonal frequency-division multiplexing (OFDM), the received signal is represented by OFDM modulation, the received symbol vector over the $k^{th}$ subcarrier of the $n^{th}$ OFDM symbol is y(n,k)=s(n,k)+i(n,k)+w(n,k), where n represents an OFDM symbol, k represents a subcarrier, s represents a desired signal, i represents the cross-talk interference, and w represents noise; and means for transmitting the residual signal as a next transmitted signal by the transmit antenna.

* * * * *